United States Patent [19]
Takai

[11] Patent Number: 5,933,843
[45] Date of Patent: Aug. 3, 1999

[54] DOCUMENT PROCESSING APPARATUS DISPLAYING AND PROCESSING A PLURALITY OF SUCCESSIVE CONTIGUOUS PAGES OF THE SAME DOCUMENT IN OVERLAPPING WINDOWS

[75] Inventor: Yasuyuki Takai, Shiki-gun, Japan

[73] Assignee: Sharp Kabushiki Kaisha, Osaka, Japan

[21] Appl. No.: 08/731,238

[22] Filed: Oct. 11, 1996

[30] Foreign Application Priority Data

Oct. 11, 1995 [JP] Japan .................................. 7-263381

[51] Int. Cl.⁶ .................................................. G06F 17/21
[52] U.S. Cl. ............................................................ 707/526
[58] Field of Search .................................... 345/345, 346, 345/342, 339, 340, 550; 707/526, 520

[56] References Cited

U.S. PATENT DOCUMENTS

| | | | |
|---|---|---|---|
| 4,819,189 | 4/1989 | Kikuchi et al. ........................ | 345/345 |
| 5,003,499 | 3/1991 | Fujiwara et al. ....................... | 707/520 |
| 5,060,170 | 10/1991 | Bourgeois et al. ..................... | 345/342 |
| 5,276,437 | 1/1994 | Horvath et al. ........................ | 345/340 |
| 5,283,864 | 2/1994 | Knowlton ............................... | 345/350 |
| 5,337,406 | 8/1994 | Takakura et al. ....................... | 707/520 |
| 5,347,627 | 9/1994 | Hoffmann et al. ..................... | 345/334 |
| 5,390,295 | 2/1995 | Bates et al. ........................... | 345/342 |
| 5,428,736 | 6/1995 | Kahl et al. ............................. | 345/339 |
| 5,455,904 | 10/1995 | Bouchet et al. ....................... | 345/346 |
| 5,821,931 | 10/1998 | Berquist et al. ....................... | 345/346 |

FOREIGN PATENT DOCUMENTS

5-257632 10/1993 Japan .

Primary Examiner—Joseph H Feild
Assistant Examiner—John L. Young
Attorney, Agent, or Firm—Nixon & Vanderhye P.C.

[57] ABSTRACT

A method of processing a document while a plurality of successive regions of the document are displayed on a display screen of a document processing apparatus is disclosed. The display screen also displays an indicator for indicating a point thereon. The method includes the steps of: displaying the document images to overlap one another; moving the indicator on the display screen; controlling the display screen so that one of the document images corresponding to a region in which the indicator exists is displayed as an uppermost image.

8 Claims, 11 Drawing Sheets

Editing point data

| A | Data attribute |
|---|---|
| Editing point data number | 000 to 999 (e.g.003) |
| K — Name of document | Area to be filled in with name (20 characters) (e.g.)Main |
| Number of image data 1 | |
| Start address of image data 1 | |
| Number of characters of image data 1 | |
| Number of document data 1 | |
| Start address of document data 1 | |
| Number of characters of document data 1 | |
| H — Number of document data 2 | (e.g.)004 |
| Start address of document data 2 | |
| Number of characters of document data 2 | (e.g.)20 |

FIG. 3B

Page data

| B | Data attribute |
|---|---|
| H — Page number | (e.g.)001 |
| L — Number of document data 1 | |
| Number of document data 2 | |
| Number of document data 3 | |
| Number of image data 1 | |
| Page number | (e.g.)002 |
| J — Number of document data 4 | |
| Number of document data 5 | |
| Number of document data 6 | |
| Number of document data 7 | |

BACKGROUND OF THE INVENTION

1. FIELD OF THE INVENTION:

The present invention relates to a document processing apparatus, such as a word processor or a personal computer, including a document processing program as an application program.

2. DESCRIPTION OF THE RELATED ART:

In producing a document while using a word processor, a document of various sizes can be produced. However, when some of the sentences composing a document are displayed on a display screen provided for a word processor, the range in which the sentences can be displayed is limited. For example, in a commonly used word processor, even when a document is being produced such that each page of the resulting document is printed on a sheet of paper of A4 size, it is difficult to simultaneously display all the sentences corresponding to a sheet of paper of A4 size on the display screen because of various limitations on the size of the screen and the fineness of a character font.

FIG.6

Thus, in the case of correcting the contents of a produced document, it is commonly required for a user to search for a passage to be corrected by using cursor such as a mouse. Therefore, oyed, the display screen is ertically or horizontally, so to reach the passage to be le to jump to the end of the ir key such as a CTRL key and . However, in such a case, it user to grasp the context of nt to which the cursor has h part of the document the rs using a high-resolution function enabling a user to f a document corresponding to one page on one screen. However, in the case where the document consists of a plurality of pages, in order to

BACKGROUND OF THE INVENTION

1. FIELD OF THE INVENTION:

The present invention relates to a document processing apparatus, such as a word processor or a personal computer, including a document processing program as an application program.

2. DESCRIPTION OF THE RELATED ART:

In producing a document while using a word processor, a document of various sizes can be produced. However, when some of the sentences composing a document are displayed on a display screen provided for a word processor, the range in which the sentences can be displayed is limited. For example, in a commonly used word processor, even when a document is being produced such that each page of the resulting document is printed on a sheet of paper of A4 size, it is difficult to simultaneously display all the sentences corresponding to a sheet of paper of A4 size on the display screen because of various limitations on the size of the screen and the fineness of a character font.

*FIG. 7*

*FIG.8* using a cursor key among the plurality of pages. Thus, this method cannot be regarded as sufficiently easy to use, either.

In a conventional document processing apparatus such as a word processor, the user cannot rapidly look over the entire document on the display screen, so that it is adversely difficult for the user to grasp the context of a displayed passage of the document.

SUMMARY OF THE INVENTION

The document processing apparatus for processing a document includes: a display screen capable of displaying an indicator and a plurality of document images, the indicator indicating a point on the display screen, and the plurality of document images corresponding to successive regions of the document; indicator moving means for moving the indicator; and a controller for controlling the display screen and the indicator moving means. The plurality of document images are displayed to overlap one

DOCUMENT PROCESSING APPARATUS DISPLAYING AND PROCESSING A PLURALITY OF SUCCESSIVE CONTIGUOUS PAGES OF THE SAME DOCUMENT IN OVERLAPPING WINDOWS

BACKGROUND OF THE INVENTION

1. Field of the Invention

The present invention relates to a document processing apparatus, such as a word processor or a personal computer, including a document processing program as an application program.

2. Description of the Related Art

In producing a document while using a word processor, a document of various sizes can be produced. However, when some of the sentences composing a document are displayed on a display screen provided for a word processor, the range in which the sentences can be displayed is limited. For example, in a commonly used word processor, even when a document is being produced such that each page of the resulting document is printed on a sheet of paper of A4 size, it is difficult to simultaneously display all the sentences corresponding to a sheet of paper of A4 size on the display screen because of various limitations on the size of the screen and the fineness of a character font.

Thus, in the case of correcting the contents of a produced document, it is commonly required for a user to search for a passage to be corrected by using cursor keys or a pointing device such as a mouse. Therefore, when this method is employed, the display screen is required to be scrolled vertically or horizontally, so that it takes a long time to reach the passage to be corrected.

It is impossible to jump to the end of the screen by using a particular key such as a CTRL key and a cursor key in combination. However, in such a case, it also takes a long time for a user to grasp the context of the passage of the document to which the cursor has jumped or to know in which part of the document the cursor currently exists.

Some word processors using a high-resolution monitor are provided with a function enabling a user to display and confirm a part of a document corresponding to one page on one screen. However, in the case where the document consists of a plurality of pages, in order to reach the passage in question, it is necessary to search for the desired page by performing a scroll operation using a cursor key among the plurality of pages. Thus, this method cannot be regarded as sufficiently easy to use, either.

In a conventional document processing apparatus such as a word processor, the user cannot rapidly look over the entire document on the display screen, so that it is adversely difficult for the user to grasp the context of a displayed passage of the document.

SUMMARY OF THE INVENTION

The document processing apparatus for processing a document includes: a display screen capable of displaying an indicator and a plurality of document images, the indicator indicating a point on the display screen, and the plurality of document images corresponding to successive regions of the document; indicator moving means for moving the indicator; and a controller for controlling the display screen and the indicator moving means. The plurality of document images are displayed to overlap one another in such a manner that a first document image corresponding to a first region of the document in which the indicator exists is displayed uppermost. When the indicator moves from the first region to a second region which precedes or follows the first region, the controller controls the display screen to display a second document image corresponding to the second region of the document uppermost in place of the first document image.

In one embodiment of the invention, the document processing apparatus further includes a size varying means for varying the size of each of the plurality of document images, wherein the size of each of the plurality of document images after being varied is determined by a length of a time period in which the size varying means is active.

In another embodiment of the invention, the second region corresponding to the second document image follows the first region corresponding to the first document image, and the second document image appears on the display screen when the size of the first document image is reduced to a predetermined size.

In still another embodiment of the invention, the size of each of the document images after being varied decreases and the number of document images among the plurality of document images increases as the length of the time period increases.

In still another embodiment of the invention, the size varying means includes at least one key.

The method of processing a document while a plurality of successive regions of the document are displayed on a display screen of a document processing apparatus, the display screen also displaying an indicator for indicating a point thereon, includes the steps of: displaying the plurality of document images to overlap one another; moving the indicator on the display screen; and controlling the display screen so that one of the document images corresponding to a region in which the indicator exists is displayed as an uppermost image.

In one embodiment of the invention, the step of controlling the display screen includes the steps of: detecting the indicator passing a boundary between adjacent regions, and updating the uppermost image in accordance with the detection result.

Hereinafter, the functions or the effects to be attained by the present invention will be described.

According to the present invention, when a character in a first display image displayed on the display screen is specified in a predetermined manner, a first multi-window overlapping state is caused. In the first multi-window overlapping state, the first display image is scaled down and displayed within the uppermost window (or the first window), while at least one second display image, each of which corresponds to one display range or more, is displayed within at least one window (or the second window) under the first window.

When the cursor specifying the character in the first display image displayed within the first window is moved to a character within a second display image displayed within the second window, the location indicated by the cursor moves across the first window in which the first display image is displayed to the second window. Then, a second multi-window overlapping state is caused. In the second multi-window overlapping state, the first window becomes the lower window and is partially overlapped by the second window which has become the uppermost window. Thus, the image in which the document is to be edited is located within the uppermost window and the entire region of the image can be seen.

In this case, if the number of windows in the first multi-window overlapping state is increased in accordance with the length of a time period during which a cursor key and a zoom key are used in combination such that the display range of the second display image in question is increased every time the number is incremented, then the range to be seen can be specified.

Furthermore, if the image displayed within the uppermost window in the second multi-window overlapping state is designed to have a character font larger than the character font of the image when it was displayed in a lower window in the first multi-window overlapping state, the image to be seen can be enlarged and a desired character can be searched for more easily.

Thus, the invention described herein makes possible the advantage of providing a document processing apparatus for enabling a user to easily grasp the context of a displayed passage of a document.

This and other advantages of the present invention will become apparent to those skilled in the art upon reading and understanding the following detailed description with reference to the accompanying figures.

BRIEF DESCRIPTION OF THE DRAWINGS

FIG. 6 illustrates a display state when Page N displayed as Region 1 has been zoomed out to have an area ¼ as large as the original area on the display screen.

FIG. 8 illustrates a display state where Page (N+2) displayed as Region 3 is displayed within the uppermost window.

DESCRIPTION OF THE PREFERRED EMBODIMENTS

Hereinafter, the embodiments of the present invention will be specifically described with reference to the accompanying drawings.

In this example, an exemplary case where the documents stored in a software object are managed on the display screen of a word processor will be described.

Figure 1:
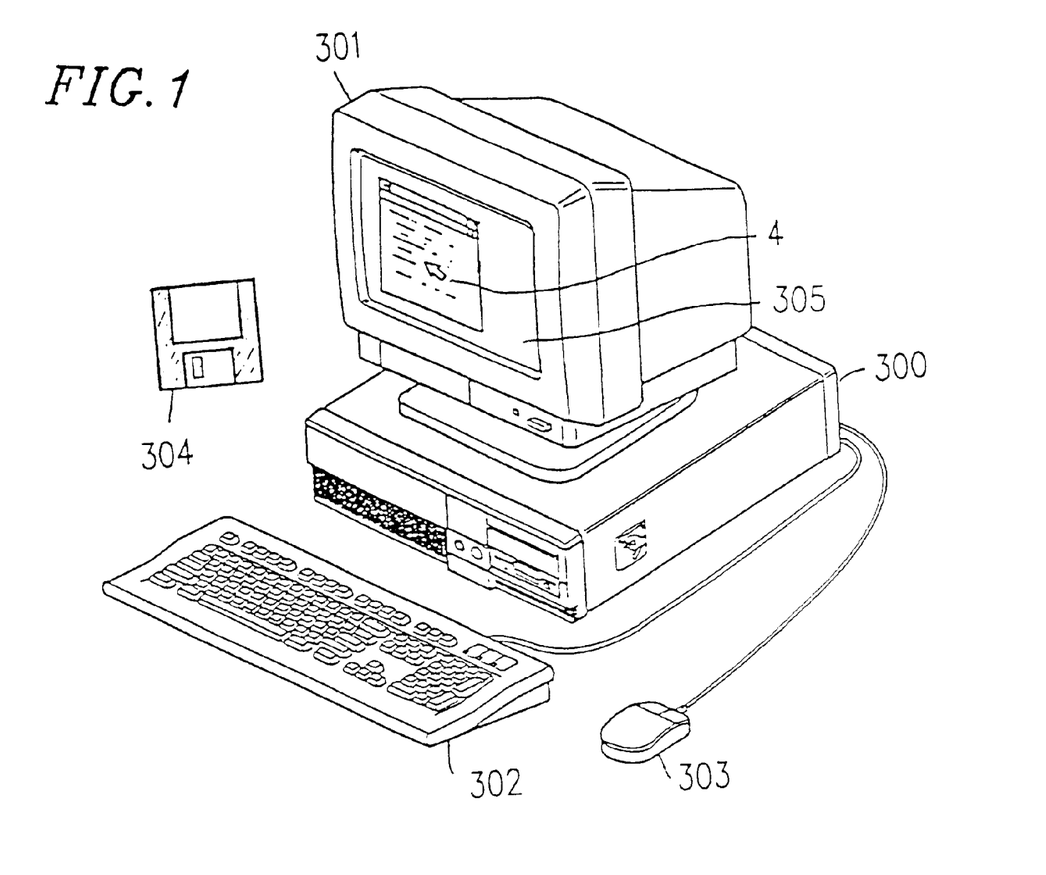
FIG. 1 is a perspective view showing an external configuration of a word processor according to the present invention.

FIG. 1 is a perspective view showing an external configuration of a word processor according to the present invention. The word processor includes: a data processing apparatus 300; a display apparatus 301 having a display screen 305; a keyboard 302 functioning as an input device for inputting data or an instruction therethrough; a mouse 303 functioning as a pointing device for zooming, moving a cursor, clicking and dragging; and a storage medium 304 for storing data or the like therein. On the display screen 305, a display image such as a window and a cursor 4 functioning as an image indicator for indicating the location within the display image are displayed. The cursor 4 has been designed by a program installed into the data processing apparatus; 300 so as to move within a limited range on the display screen 305 in response to the instructions input through the mouse 303.

Figure 2:
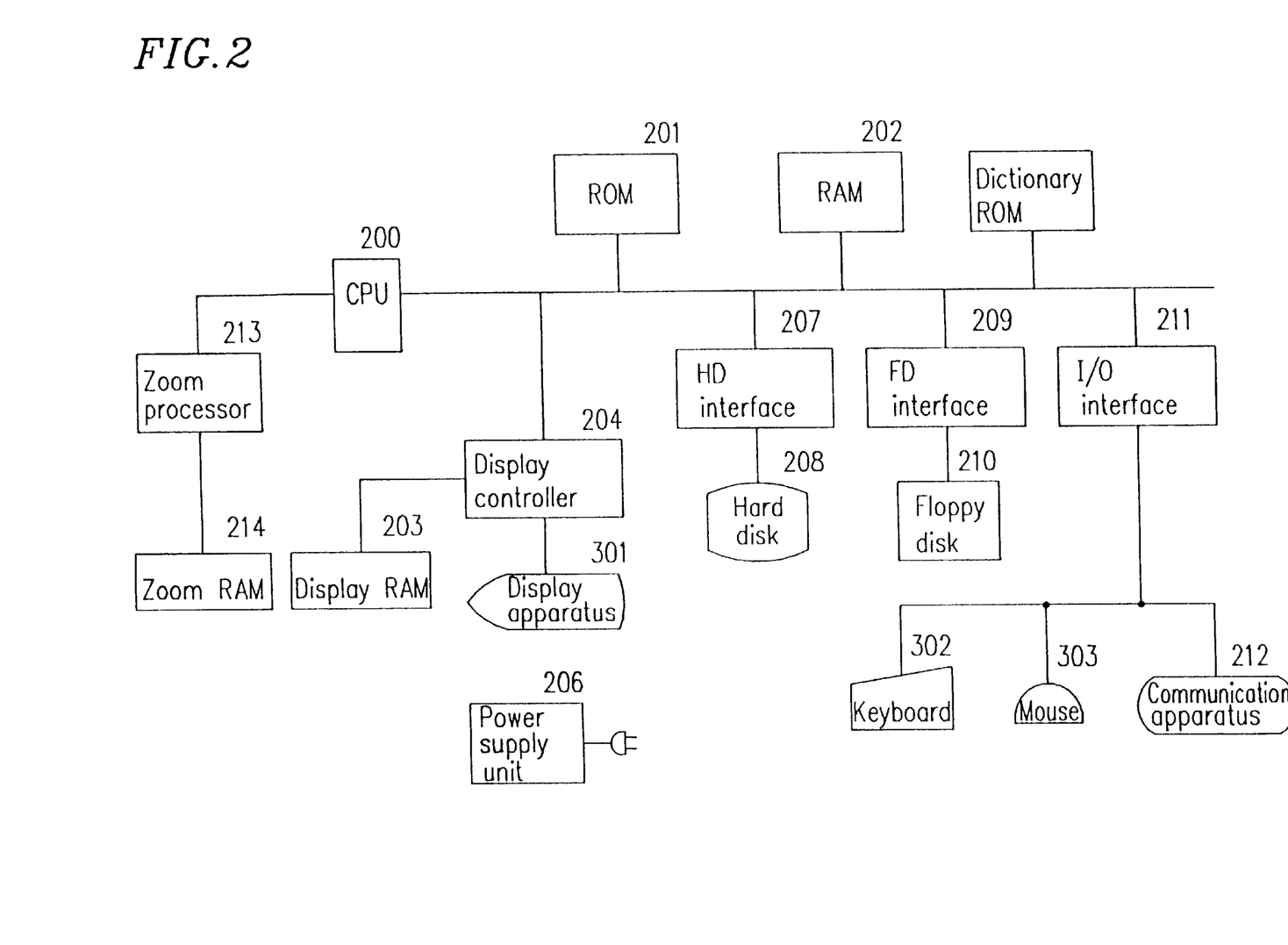
FIG. 2 is a block diagram showing a system configuration of the word processor according to the present invention.

FIG. 2 is a block diagram showing a system configuration of the word processor according to the present invention. The word processor includes: a CPU 200 for performing control and operation processing with respect to input data; a read-only memory (ROM) 201 in which programs for operating the CPU 200 are stored; a random access memory (RAM) 202 for temporarily storing data supplied from a storage device such as a hard disk 208 or an input device such as the keyboard 302 and for storing programs or data required for making the CPU 200 perform the operation processing; a display RAM 203 for storing data representing the display images to be displayed on the display apparatus 301 under the control of a display controller 204; the display controller 204 for rearranging data or generating a control signal such that a display image such as a window or a cursor can be displayed on the display apparatus 301; an HD interface 207 for connecting the hard disk 208 and the CPU 200 to each other; the hard disk 208 for storing an application program and a program for controlling a display image such as a window; an FD interface 209 for connecting a floppy disk drive 210 and the CPU 200 to each other; a floppy disk functioning as the storage medium 304 onto which data or programs are written; an I/O interface 211 for connecting the keyboard 302, the mouse 303 and a communication apparatus 212 to the CPU 200; a zoom RAM 214 in which a program on the zooming processing to be described later is stored; a zoom processor 213 for performing a control required for the zooming processing; and a power supply unit 206.

In the case where the display apparatus 301 performs a color display, the zoom processor 213 also performs a color adjustment control with respect to the respective dots in various colors to be varied during the zooming. The communication apparatus 212 is an apparatus, to which a MODEM or a LAN is connected, for communicating with an external information processing apparatus. In general, an apparatus conformable to a standard such as RS-232C is employed as the communication apparatus 212.

Figure 3A:
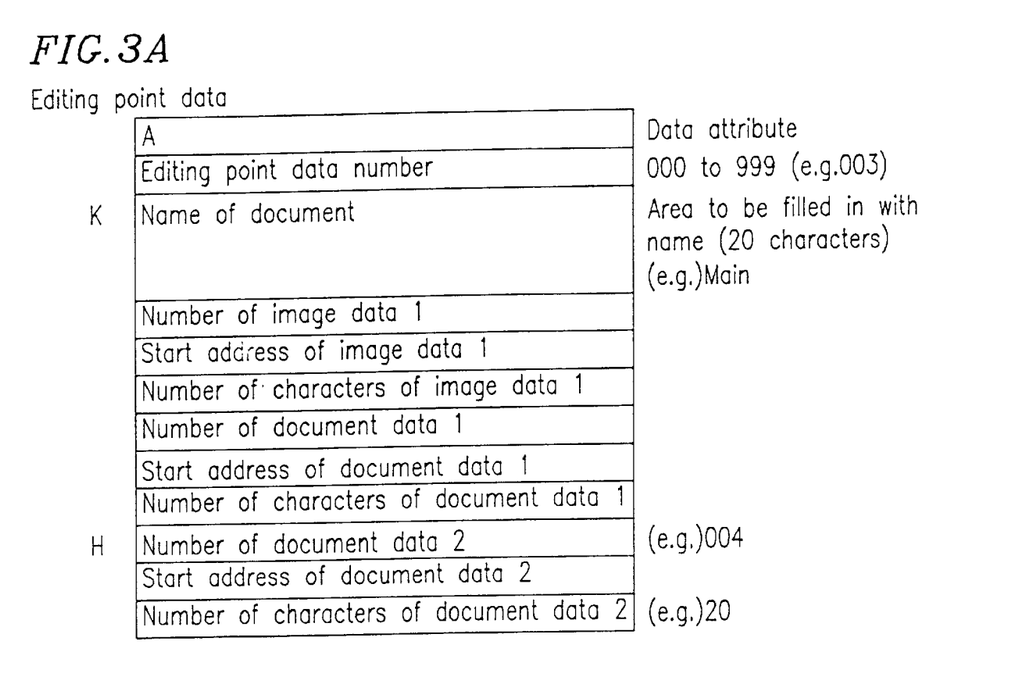
FIGS. 3A and 3B illustrate the -types of data stored in the storage device of the word processor according to the present invention.
Figure 3B:
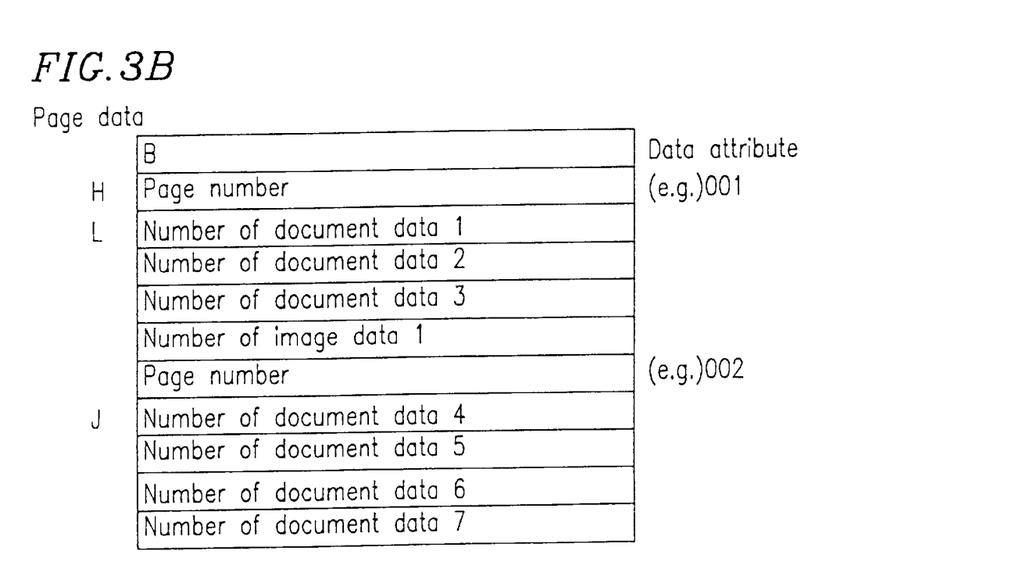

FIGS. 3A and 3B illustrate the types of the data. Editing point data shown in FIG. 3A and page data shown in FIG. 3B are stored in the hard disk 208.

Figure 4:
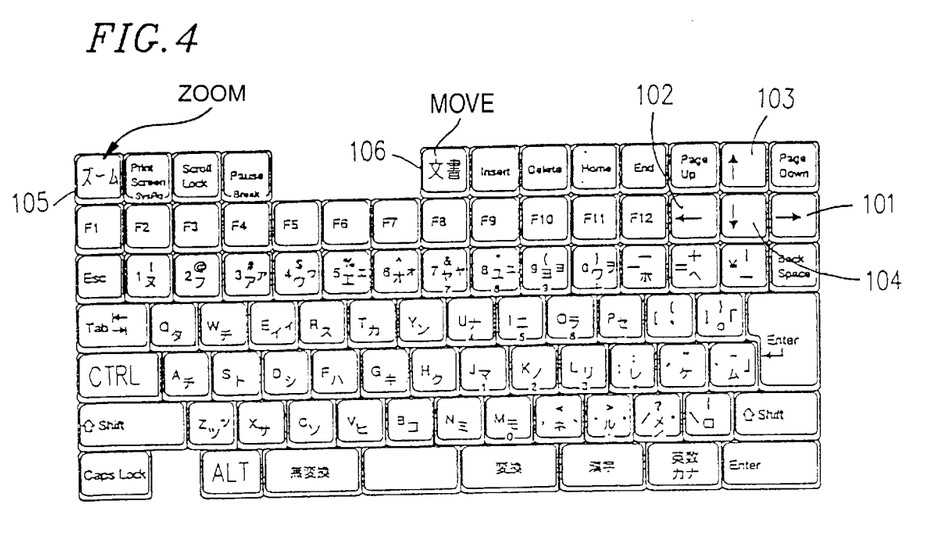
FIG. 4 is a front view showing an exemplary keyboard of the word processor.

FIG. 4 is a front view showing an exemplary keyboard of the word processor. On the keyboard, cursor keys are provided at the upper right corner and a key exclusively used for zooming in and zooming out (hereinafter, simply referred to as a "zoom key") is provided at the upper left corner. More specifically, a rightward cursor key 101, a leftward cursor key 102, an upward cursor key 103, a downward cursor key 104, a zoom key 105, and a document move key 106 are provided. A CTRL key or an ALT key may be used in place of each of these keys.

By manipulating with this keyboard, the following operations are performed.

(1) In the case of manipulating with a cursor key alone, the cursor moves on a line basis or on a character basis.

(2) In the case of manipulating with the rightward cursor key 101 and the zoom key 105 in combination, the display image is enlarged around the current cursor.

(3) In the case of manipulating with the leftward cursor key 102 and the zoom key 105, the display image is zoomed out around the current cursor.

(4) In the case of manipulating with the document move key 106 and any of the cursor keys 101 to 104, the entire document is moved to the direction specified by the cursor key.

The zoom-in or the zoom-out operation is performed by magnifying or scaling down an image based on the data illustrated in FIGS. 3A and 3B in accordance with the length of a time period during which the selected keys are being pressed. In this case, the time length can be measured by the number of clock cycles generated by the CPU 200 and it is determined based on the relationship between the number of clocks and a predetermined reference value whether the image is to be magnified or scaled down. On the other hand, the size or the area of a magnified or scaled down window is determined by a square of the ratio of the distance between the right end and the left end of the upper side (or between the upper end and the lower end of the right side) of the magnified or scaled down window to the distance between the right end and the left end of the upper side (or between the upper end and the lower end of the right side) of the original display image (the magnification power thereof is assumed to be 1) on the display screen.

Figure 9:
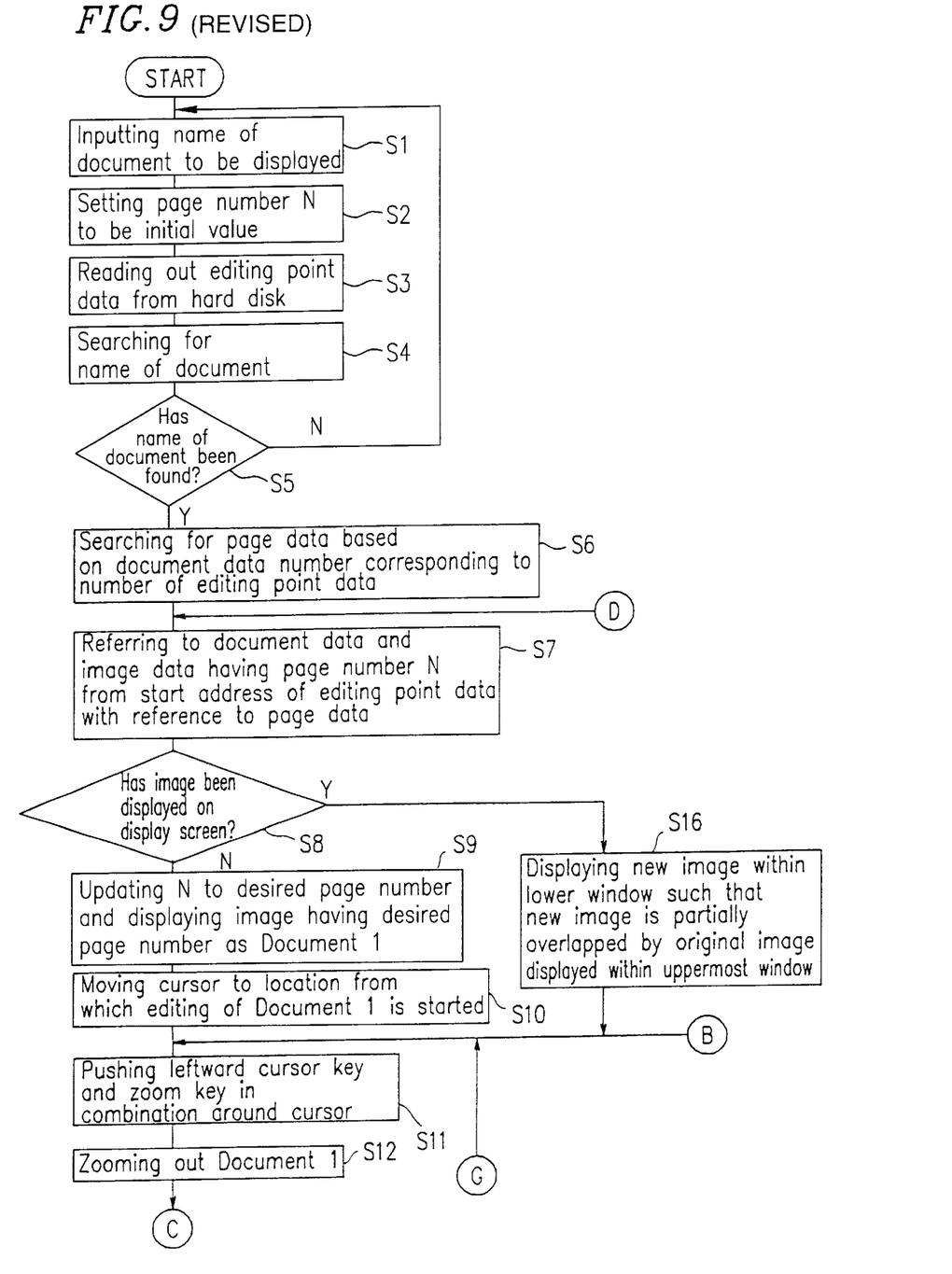
FIG. 9 is a flowchart illustrating a part of the steps performed by the word processor according to the present invention.
Figure 10:
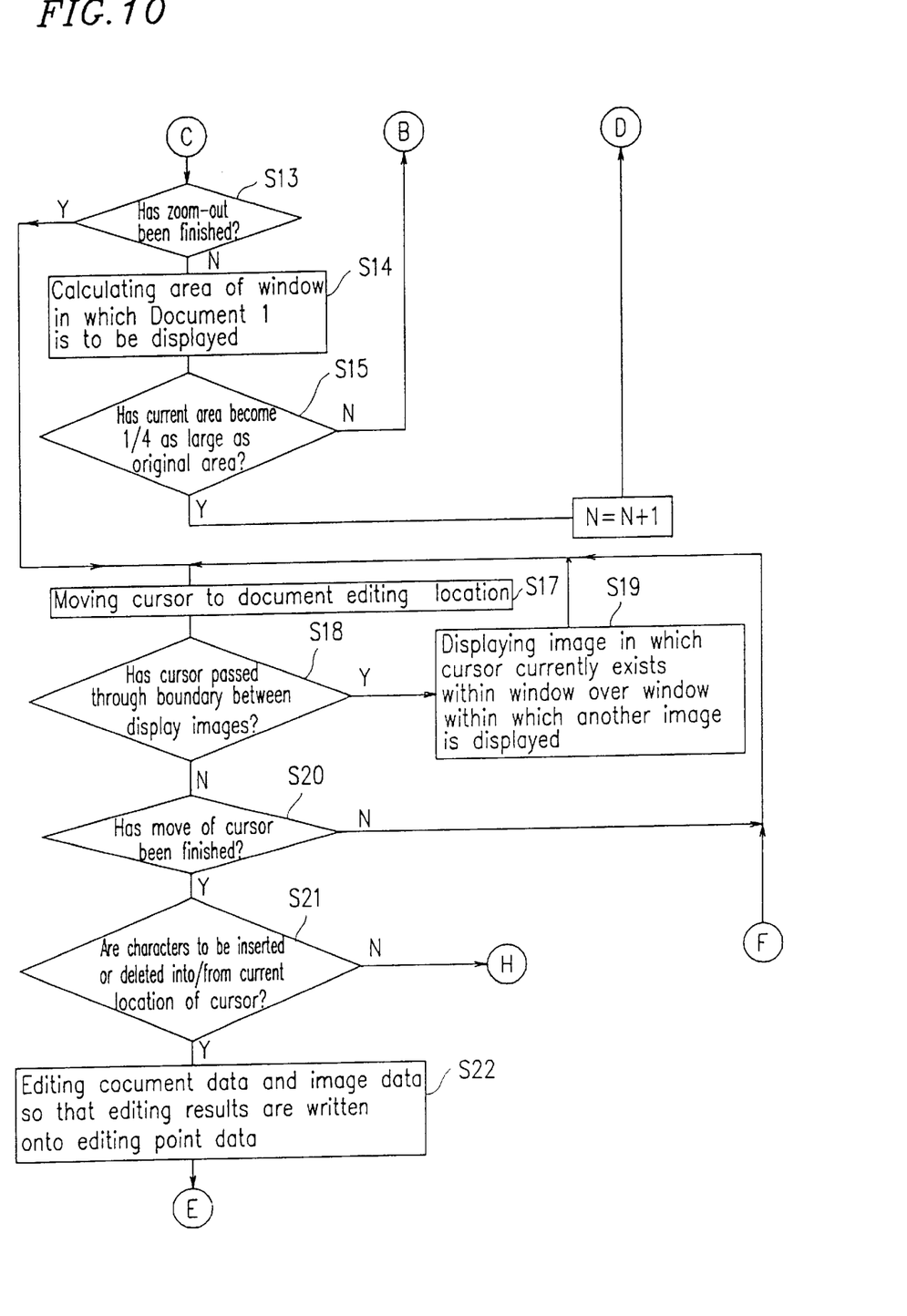
FIG. 10 is a flowchart illustrating another part of the steps performed by the word processor according to the present invention.
Figure 11:
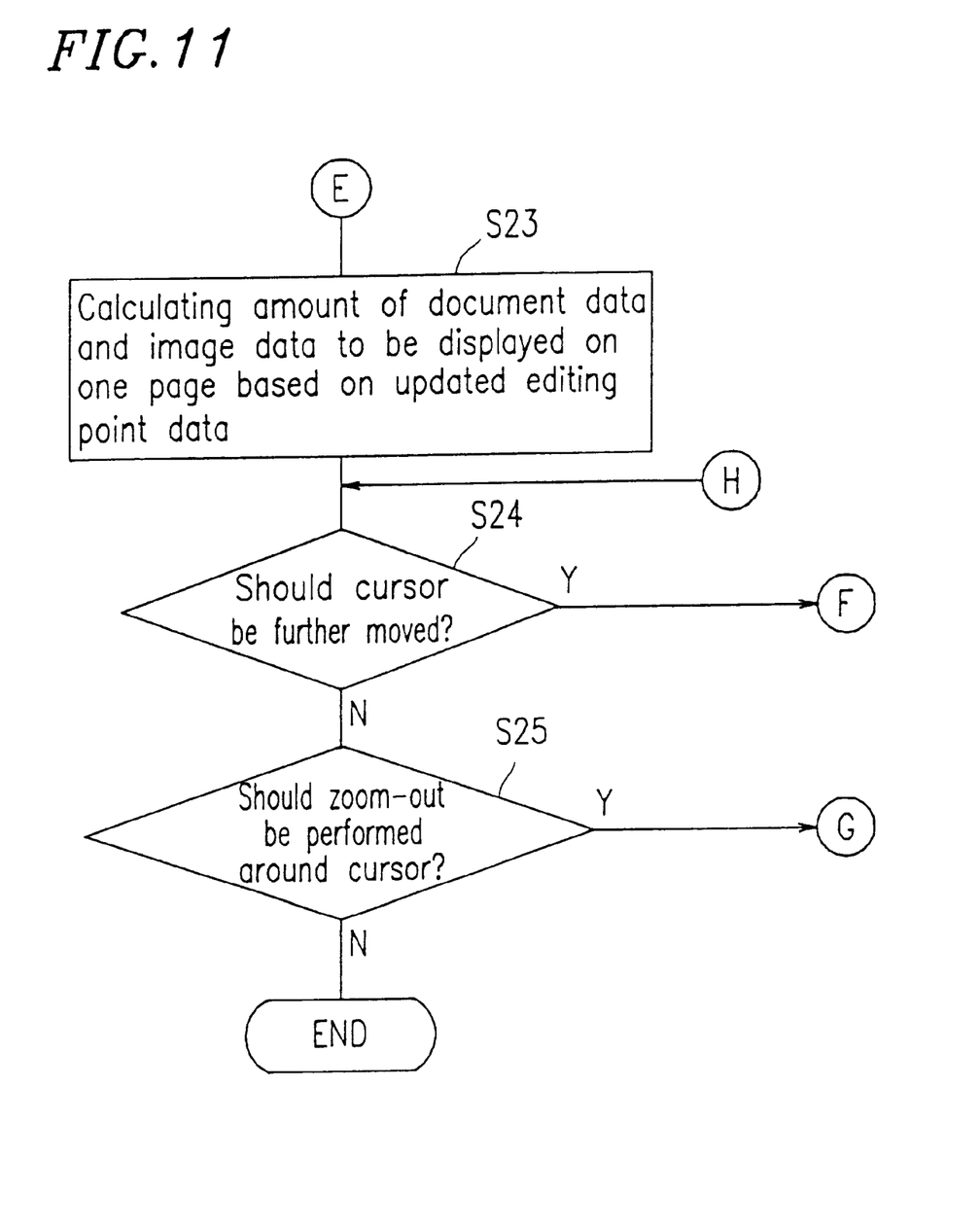
FIG. 11 is a flowchart illustrating the remaining steps performed by the word processor according to the present invention.

Next, the procedure for performing a zoom-out operation using a cursor key and for selecting a desired document will be sequentially described with reference to FIGS. 5 to 8 and the flowcharts illustrated in FIGS. 9 to 11.

First, at Step S1, the name of a document to be displayed is input through the keyboard 302. As a result, the word processor sets the page number N (where N is a positive integer) to be an initial value of 1 (S2). Next, the editing point data is read out from the storage device or the hard disk 208 (S3) and the name of the document is searched for among the editing point data (S4). If the name of the document has been found (S5), then the processing proceeds to S6, in which page data is searched for based on the document data number corresponding to the number of the editing point data including the name of the desired document.

Figure 5:
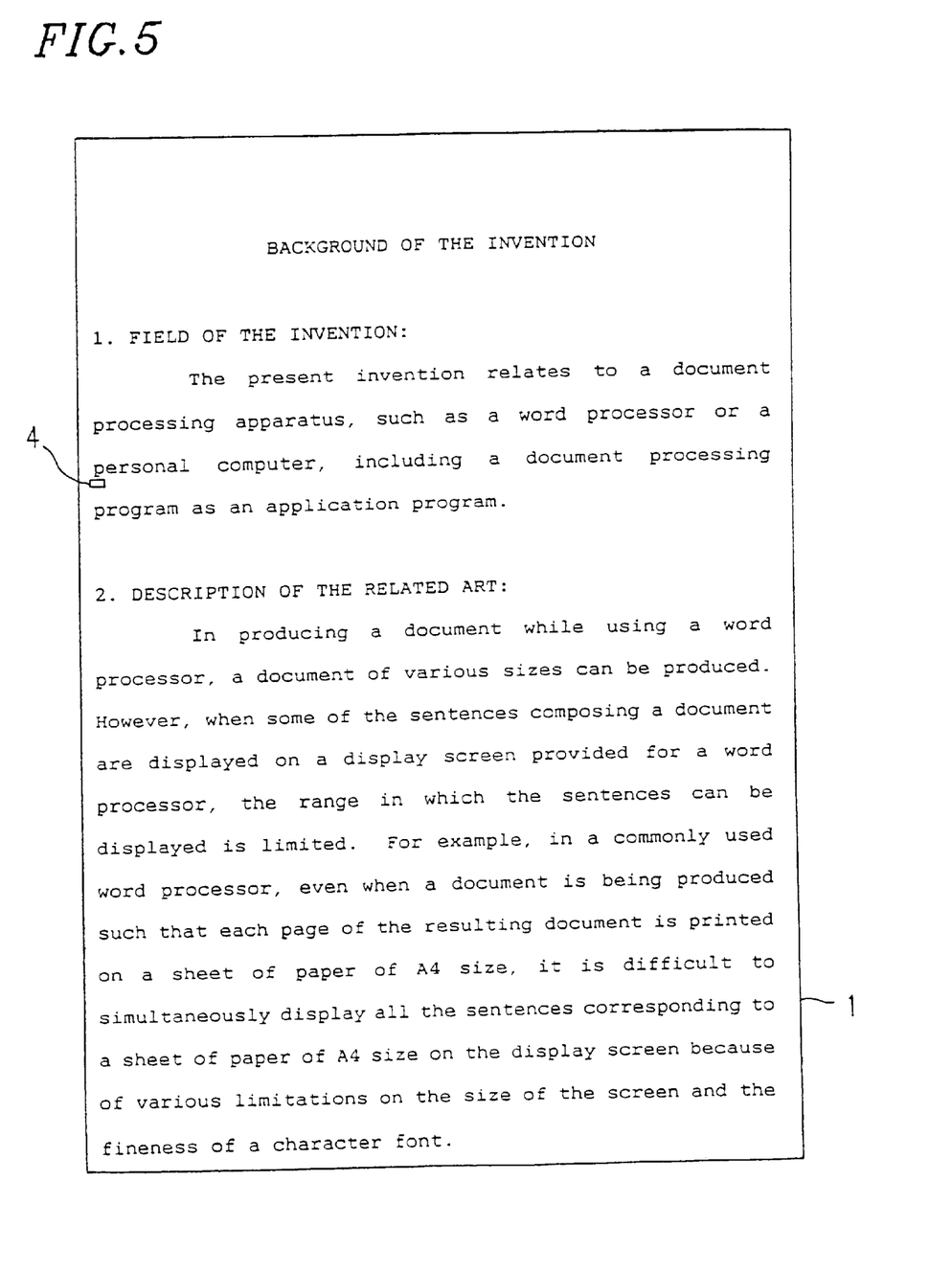
FIG. 5 illustrates a typical display state on the display screen.

Next, at S7, while making a reference to the page data, the document date and the image data corresponding to the document and the image having the page number N are referred to from the start address of the editing point data. Then, at S8, it is determined whether or not an image has already been displayed on the display screen. In this case, since no image has been displayed, the processing proceeds to S9, in which N is updated by a desired page number specified through the keyboard 302, thereby displaying an image corresponding to the specified page number N. FIG. 5 illustrates a typical display state on the display screen, on which Page N is displayed as Region 1.

Next, the cursor 4 is moved to a location from which editing of the region of the document is started by manipulating the keyboard or the mouse (S.10). In the example shown in FIG. 5, the cursor 4 is positioned at the location "p" of the passage "personal computer" on the fifth line from the top. Next, if the leftward cursor key 102 and the zoom key 105 are pushed in combination around the cursor 4 in such a state (S11), then the processing proceeds to S12, in which Region 1 is zoomed out (or scaled down) since the leftward cursor key 102 instructs the zoom-out operation. Then, at S13, it is determined whether or not the zoom-out operation has been finished. If the zoom-out operation has not been finished yet, then the display area or the area of the window in which Region 1 is to be displayed is calculated (S14) and it is determined whether or not the current display area has become ¼ as large as the original area or whether or not the distance between both ends of one side of the current display image has become ½ as long as the distance between both ends of the side of the original image on the display screen (S15). It is noted that the cursor key 102 and the zoom key 105 are required to be pushed until the current area has become ¼ as large as the original area. FIG. 6 illustrates a display state when Page N displayed as Region 1 has been zoomed out to have an area ¼ as large as the original area on the display screen.

When the area becomes ¼ of the original area, the processing returns to S7, in which a next page number (N+1) is specified. As a result, the original display image is scaled down to partially overlap a newly opened window. Herein, it is assumed that the newly opened window will be referred to as a "lower window" (or a "lowermost window" in the case where the number of opened windows is 3 or more) and the window in which the scaled down image is displayed will be referred to as an "upper window" (or a "uppermost window" in the case where the number of opened windows is 3 or more) and that the state shown in FIG. 6 will be called a "first: multi-window overlapping state". In the first multi-window overlapping state, Page N which has been displayed as Region 1 has been scaled down and displayed within the upper window and Page (N+1) is displayed as Region 2 within the lower window (S16).

Figure 7:
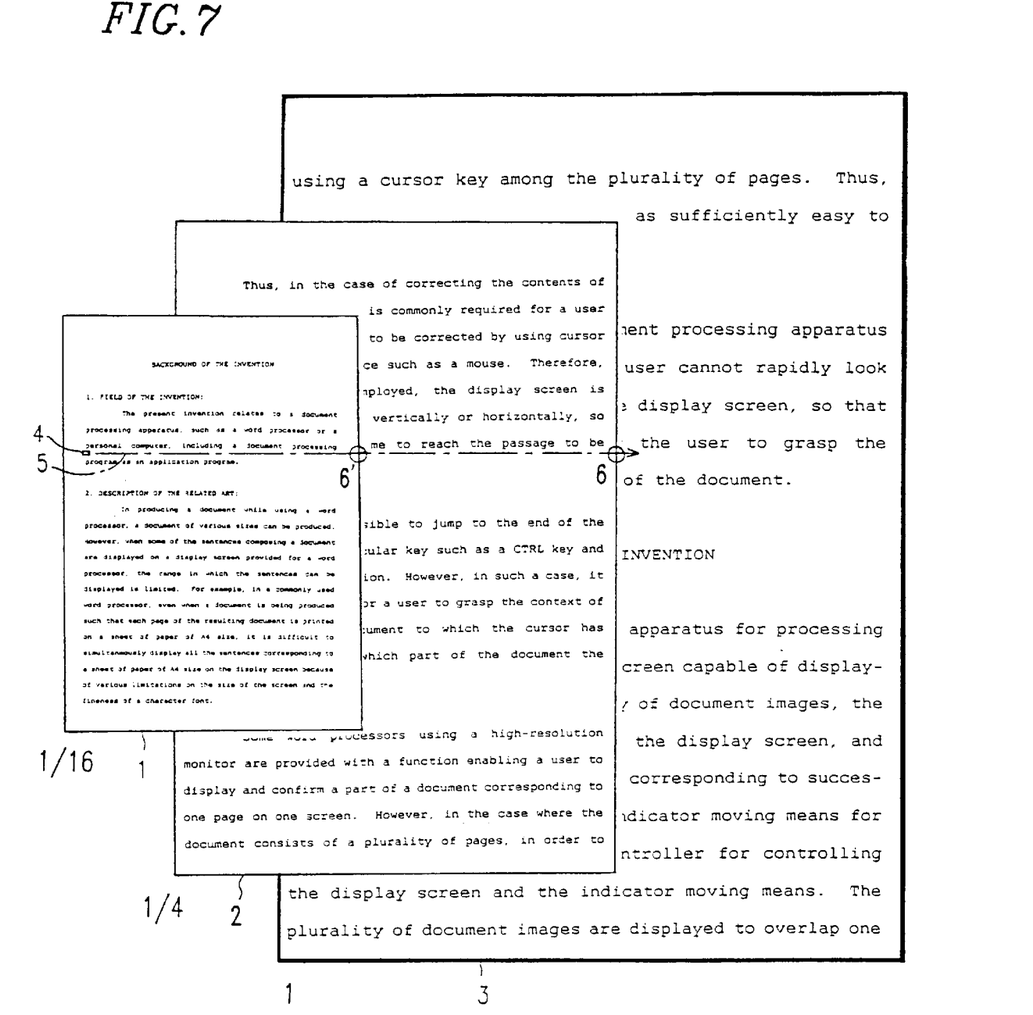
FIG. 7 illustrates a display state when Page (N+1) displayed as Region 2 has been zoomed out to have an area ¼ as large as the area in the state shown in FIG. 6.

Next, the processing proceeds to S11, repeats S12 to S15 and then returns to S7 to specify a next page number (N+2). In this example, since the total number of windows to be displayed in a multi-window overlapping state is set to be 3, this is the last page to be specified. As a result, as shown in FIG. 7, Page N displayed as Region 1 and Page (N+1) displayed as Region 2 have been zoomed out to be ¼ as large as the images shown in FIG. 6, and Page N is displayed as Region 1 within the uppermost window, Page (N+1) is displayed as Region 2 within the middle window and Page (N+2) is displayed as Region 3 within the lowermost window. Herein, the state shown in FIG. 7 will be called a "second multi-window overlapping state". In. the second multi-window overlapping state, since Region 1 in which the cursor 4 is currently located has been scaled down to be ⅙ of the original image, the characters written thereon are no longer readable.

Next, the user of the word processor confirms a document editing location and then moves the cursor 4 to the document editing location (S17). In this example, the user moves the cursor 4 to Page (N+2) displayed as Region 3 for editing a passage on Page (N+2). This move is performed by the use of the rightward cursor key 101 and the downward cursor key 104. Alternatively, the move is also realized by using the mouse 303 instead of manipulating the cursor keys 101 and 104. Then, it is determined whether or not the cursor 4 has passed through the boundary 6' between Page N and Page (N+1) (S18). In this case, if the cursor 4 is moved to the display region for Region 2 via the route 5, then Region 1 is displayed within the middle window and Region 2 is displayed within the uppermost window (S19). Then, if the cursor 4 is further moved to the location "i" of the passage "images" on the 14th line of Region 3 displayed within the lowermost window, a third multi-window overlapping state shown in FIG. 8 is caused. That is to say, Region 3 which has been displayed within the lowermost window is displayed within the uppermost window over the middle and the lowermost windows in which Regions 2 and 1 are displayed, respectively. In this case, as shown in FIG. 7, when the user starts moving the cursor 4 from Region 1, a large part of Region 3, in which the destination point of the cursor 4 exists, is hidden by Regions 1 and 2. When the cursor 4 has reached Region 3 after passing through the boundary 6' between Regions 1 and 2 and the boundary 6 between Regions 2 and 3, the display controller 204 determines that the move of the cursor 4 is finished, i.e., the region to be edited has changed from Region 1 into Region 3 (S20), thereby displaying the entire page (N+2) as Region 3 as shown in FIG. 8.

Next, it is determined whether or not characters are inserted or deleted into/from the region of the document in which the cursor 4 currently exists (S21). If characters should be inserted or deleted into/from the region of the document in which the cursor 4 currently exists, then the user edits the document data and the image data of the document so that the results of the editing are reflected upon the editing point data (S22). Next, at S23, the amount of the document data and the amount of image data to be displayed on one page are calculated based on the updated editing point data, thereby editing the page data. In this case, it is naturally possible to edit Region 3 while keeping the size shown in FIG. 8. However, if necessary, Region 3 may be enlarged to be of a desired size by using the zoom key 105 and the rightward cursor key 101. After the insertion or the deletion has been performed with respect to the region of the document, the processing proceeds to S24 to determine whether or not the cursor 4 should be further moved. If the cursor 4 should be moved again, the processing returns to S17 and then repeats S17 to S24. Then, in S25, it is determined whether or not the zoom-out operation should be performed around the cursor 4. If the operation is not performed within a predetermined time, the processing ends.

In performing the insertion or the deletion with respect to a document, the entire Region 3 in which the cursor 4 currently exists may be moved to an arbitrary location on the screen by using the document move key 106 and a cursor key for visually confirming the relationship between Page (N+1) displayed as Region 2 and Page (N+2) displayed as Region 3.

In the above-described example, the present invention has been described as being applied to a word processor. However, the present invention is not limited thereto, but is similarly applicable to any other document processing apparatus such as a personal computer.

Also, in the above-described example, the present invention has been described as being applied to a case where Pages N, (N+1) and (N+2) are displayed in succession as Regions 1, 2 and 3 in the multi-window overlapping state. However, the present invention is not limited thereto, but is similarly applicable to cases where 3 or more pages of documents following Page N as Region 1 are displayed. In addition, the present invention is also applicable to cases where at least one page of document preceding Page N as Region 1 is displayed. Furthermore, the present invention is also applicable to cases where at least one page of document preceding Page N as Region 1 is displayed within a window over or under the window in which Page N is displayed and at least one page of document following Page N is displayed within a window opposite the window in which at least one page of document preceding Page N is displayed via the window in which Page N is displayed.

Furthermore, in the above-described example, each page is assumed to correspond to one display range. However, the present invention is not limited thereto, but is similarly applicable to either a case where each page is larger than one display range or a case where each page is smaller than one display range. In such a case, the multi-window display may also be performed by assuming that one display range includes a predetermined number of lines.

As is apparent from the foregoing detailed description, the present invention can provide a document processing apparatus which enables a user to produce a document more easily.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly constructed.

What is claimed is:

1. A document processing apparatus for processing a document stored as a file associated with a software application, the apparatus comprising:

a display screen displaying an indicator and a plurality of document images, the indicator indicating a point on the display screen, and the plurality of document images corresponding to successive and contiguous regions of the document which contain the same type of information;

a user input operatively coupled to the apparatus such that the user moves the indicator by manipulating the user input; and a controller operatively coupled to the display screen and the user input, wherein the plurality of document images overlap one another such that a first document image corresponding to a first region of the document in which the indicator exists is displayed uppermost, and the second and third regions are partially visible on the display and are overlapped by the first document image, and wherein, as the indicator moves from the first document image displaying the first region to the second document image displaying the second region, the controller, in response to the indicator pointing to the second region, causes the second document image displaying the second region to be displayed as the top image in place of the first document image presenting the first image.

2. A document processing apparatus according to claim 1, further comprising a size varying means for varying the size of each of the plurality of document images, wherein the size of each of the plurality of document images after being varied is determined by a length of a time period in which the size varying means is active.

3. A document processing apparatus according to claim 2, wherein the second region corresponding to the second document image follows the first region corresponding to the first document image, and the second document image appears on the display screen when the size of the first document image is reduced to a predetermined size.

4. A document processing apparatus according to claim 2, wherein the size of each of the document images after being varied decreases and the number of document images among the plurality of document images increases as the length of the time period increases.

5. A document processing apparatus according to claim 2, wherein the size varying means includes at least one key.

6. A method of processing a document stored as a file associated with a software application and while a plurality of successive and contiguous regions of the document which contain the same type of information are displayed on a display screen of a document processing apparatus, the display screen also displaying an indicator for indicating a point thereon, the method comprising the steps of:

(a) displaying the plurality of document images to overlap one another;

(b) moving the indicator on the display screen;

(c) controlling the display screen so that one of the document images corresponding to a region in which the indicator exists is displayed as an uppermost image, and (d) repeating steps (a)–(c) to continually display the image to which the indicator points to as the uppermost image.

7. A method of processing a document according to claim 6, wherein the step of controlling the display screen includes the steps of:

detecting the indicator passing a boundary between adjacent regions, and updating the uppermost image in accordance with the detection result.

8. A method of processing a document, where the document is stored as a text file associated with a word processing software application, and a plurality of successive and contiguous regions of the document which contain the same type of information are displayed simultaneously and automatically on a display screen of a document processing apparatus including a controller, the display screen also displaying a user movable pointer, the method comprising the steps of:

(a) the controller segmenting the document into at least first, second and third regions, wherein the regions are successive regions of the document;

(b) the controller simultaneously displays the first, second and third regions of the document as first, second and third document image windows, respectively;

(c) the controller displays the first document image window as a top image, and overlaps the top image over the second and third image windows such that the second and third image windows are partially overlapped by the top image, and where the pointer points to the top image;

(d) as the user moves the pointer from the top image to one of the second or third document images, the controller senses whether the pointer points to the second or third image;

(e) after step (d), the controller displays as the top image, the second or third image to which the pointer points, and displays the first image, which is no longer the top image, underneath the top image, and (f) the controller repeats steps (d) and (e) to continually display as the top image the image to which the pointer points.

* * * * *